United States Patent Office 3,555,548
Patented Jan. 12, 1971

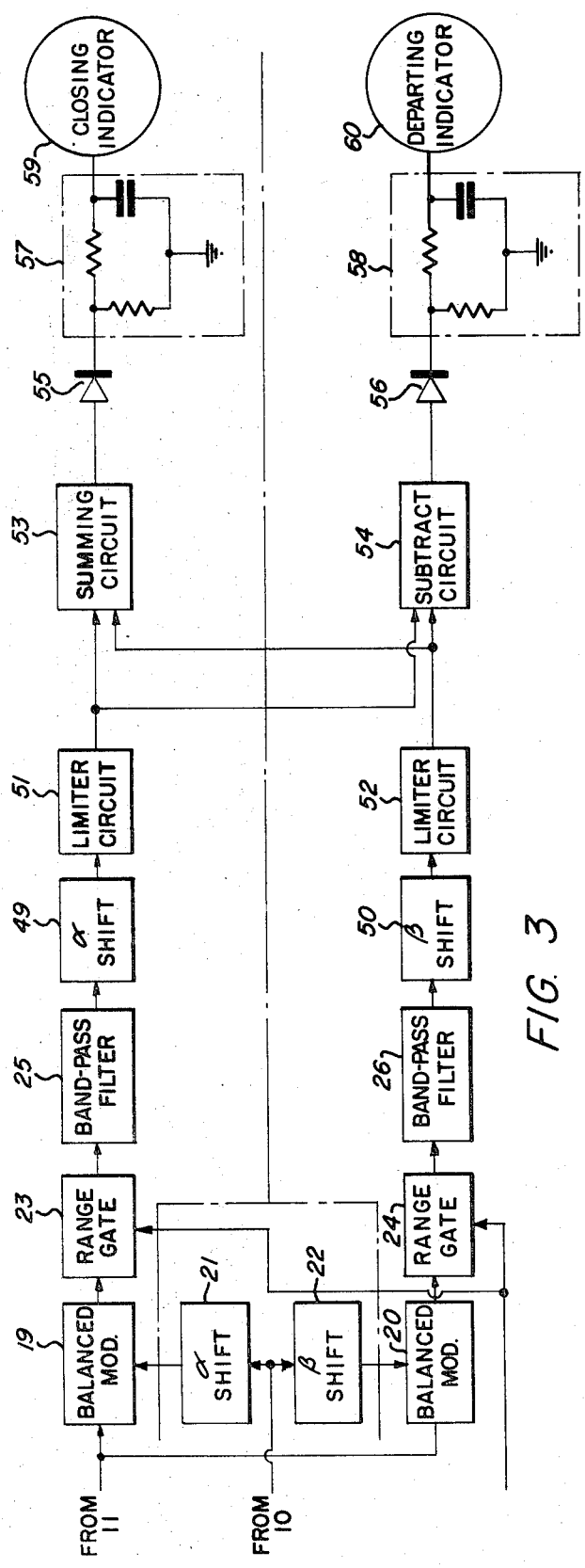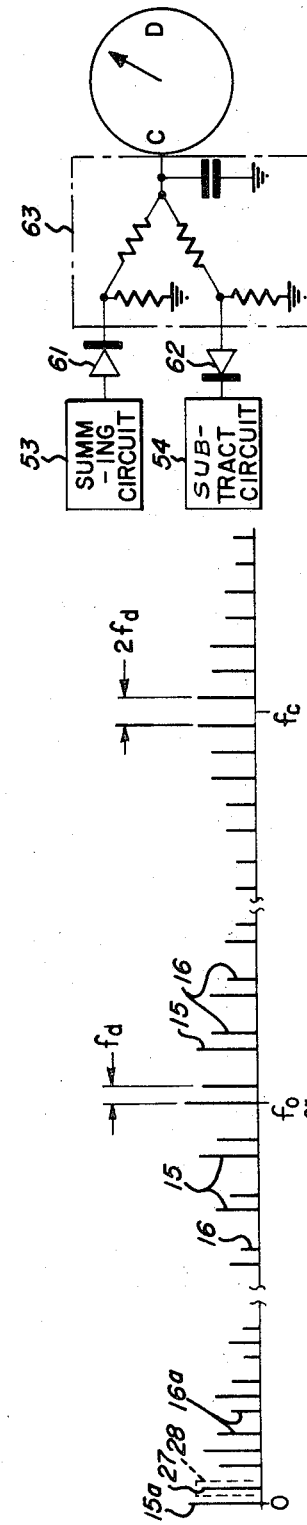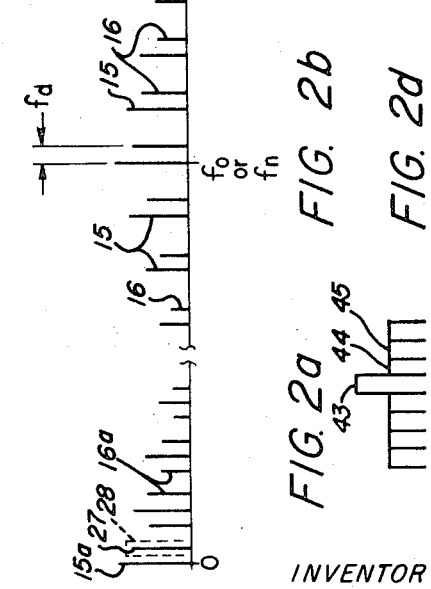

3,555,548
MOVING TARGET INDICATING SYSTEM
Robert L. Wyckoff, Holliston, Mass., assignor to Raytheon Company, Waltham, Mass., a corporation of Delaware
Filed Feb. 17, 1961, Ser. No. 90,044
Int. Cl. G01s 9/44; G01r 23/00
U.S. Cl. 343—7.7                                        13 Claims

ABSTRACT OF THE DISCLOSURE

A coherent MTI radar system wherein a Doppler video signal is processed in a manner such that an indication is provided of whether a target is approaching or receding relative to the rodar system. The processing is accomplished by forming two signals, the first of which is generated by mixing the Doppler video signal with a reference frequency signal, the second of which is generated by mixing the Doppler video signal with the quadrature phase component of the reference frequency signal. The two signals are filtered and an additional 90° phase shifter is added between the two signals. The two signals are then combined in a summing circuit and a subtracting circuit such that the signal produced by the summing/subtracting circuits provides an indication of an approaching or recording target.

---

This invention relates to moving target indicating systems and more particularly to circuits for detecting Doppler-shifted signals reflected from a moving target whereby the target and the sense of its motion are detected.

In the past moving target indicating (MTI) systems of two general types having been employed for detecting Doppler-shifted reflected signals from clutter and noise. One system employs a cancellation circuit for cancelling the clutter reflected from stationary targets leaving only Doppler-shifted pulses and noise. The other system eliminates some noise and the clutter by first heterodyning reflected radar signals producing an intermediate frequency (IF) signal and mixing this with a coherent frequency equal to the IF frequency, then filtering the output of the mixer to subsequentially antenuate some of the noise and all of the clutter. The present invention is concerned with improvements to this latter system.

In some prior systems of the latter type, sometimes called clutter frequency filter systems, the IF spectrum from the MTI system which includes a Doppler side band is mixed with a coherent reference frequency equal to the center frequency of the IF spectrum, thus folding the spectrum of the IF signals. Folding the spectrum unfortunately does increase the signal to noise ratio; however, on the other hand, it places the Doppler side band at audio frequency permitting precise filtering from clutter. After folding, the spectrum is filtered to attenuate all signals except one of the folded Doppler side bands yielding MTI video signals. In some prior systems the difficulties entailed with filtering out clutter in the IF spectrum are avoided by translating the spectrum to a higher frequency where filtering can be accomplished with a comb filter.

Heretofore, such systems for detecting Doppler video from a given radar range have employed a single channel in which IF signals are first mixed in a balanced modular with the coherent reference signal precisely equal to the center frequency of the IF spectrum. As a result, the IF spectrum is folded about zero frequency, and any distinction between upper and lower Doppler side bands, indicating positive or negative Doppler-shifted video, disappears. Next, the folded spectrum is mixed again with a translation frequency in a second balanced modulator producing identical upper and lower frequency spectrum side bands. The translation frequency is usually chosen so that one of these side band spectrums is centered at a convenient frequency for which a filter can be readily designed to pass only one of the Doppler bands in the folded spectrum and attenuate clutter, noise and other undesirable signals in the spectrum. The signal level in the output of this filter then indicates the presence of Doppler video but does not indicate the sense of the Doppler video. It does not indicate whether the target is moving toward or away from the radiating antenna. It is one object of the present invention to provide a system which not only detects the presence of Doppler-shifted video but also distinguishes between upper and lower Doppler side bands to thereby indicate whether a target is closing or departing from the radar antenna.

In the present invention, the IF is fed to two separate channels and mixed in each with the coherent reference frequency producing a folded IF spectrum in each channel. The reference frequency is fed to the two channels in phase quadrature so that a Doppler side band in one channel is in quadrature with the same side band in the other channel. The mixer output in each channel is then filtered to remove a substantial amount of clutter and then compressed by hard limiting circuits in the channels. The resulting signals in each channel are again shifted in phase so that signals in one channel shift 90° relative to signals in the other channel. These shifts may be accomplished with well-known all-pass phase shifting circuits or by mixing with a translation frequency fed to each of the channels in phase quadrature. The resulting outputs from the channel are then combined by addition or subtraction.

In accordance with other embodiments of the present invention, after phase shifting signals in one channel 90° more tha signals in the other channel for the second time, the signals in each channel are added together in one circuit and subtracted in another circuit. The output of the add circuit is applied to one indicator which indicates when a moving target is picked up which is moving toward the transmitter, while the output from the subtract circuit is applied ot another indicator which indicates when the moving target is moving away from the transmitter. In still another embodiment of the invention, the outputs from the add and subtract circuits are coupled together through suitable diode circuits and applied to a single indicator which indicates the presence of a moving target and also the sense of its direction of motion.

A number of clutter frequency filter system such as described in the present invention may be employed in conjunction with the MTI transmitting and receiving system to energize a plan position type (PPI) display. In such application, each of the clutter frequency filter systemse, such as described above, are preferably controlled by different gating pulses derived from a common gate pulse generator. The different gating pulses are shifted in time with respect to each other so that the output of each frequency filter system produces signals representing moving targets at a given range. Upon combining these outputs, a complete range swept video is produced which is quite suitable for energizing a PPI scope in conjunction with pulses from the range gate generator and signals representative of antenna rotation.

These and other features and objects of the present invention will be more apparent from the following specific description taken in conjunction with the drawings in which:

FIGS. 2a, 2b and 2c illustrate the frequency spectrum of signals in various stages of the invention to aid in understanding operation, and FIG. 2d illustrates a wave-form input to a PPI system obtained with a plurality of filter systems such as disclosed in the invention;

FIG. 3 illustrates an embodiment of the invention in which a translation oscillator is eliminated and which produces an indication of the sense of Doppler video as well as the presence of Doppler video; and FIG. 4 illustrates another embodiment wherein the presence and sense of Doppler video is indicated on a single indicator.

Figure 1:
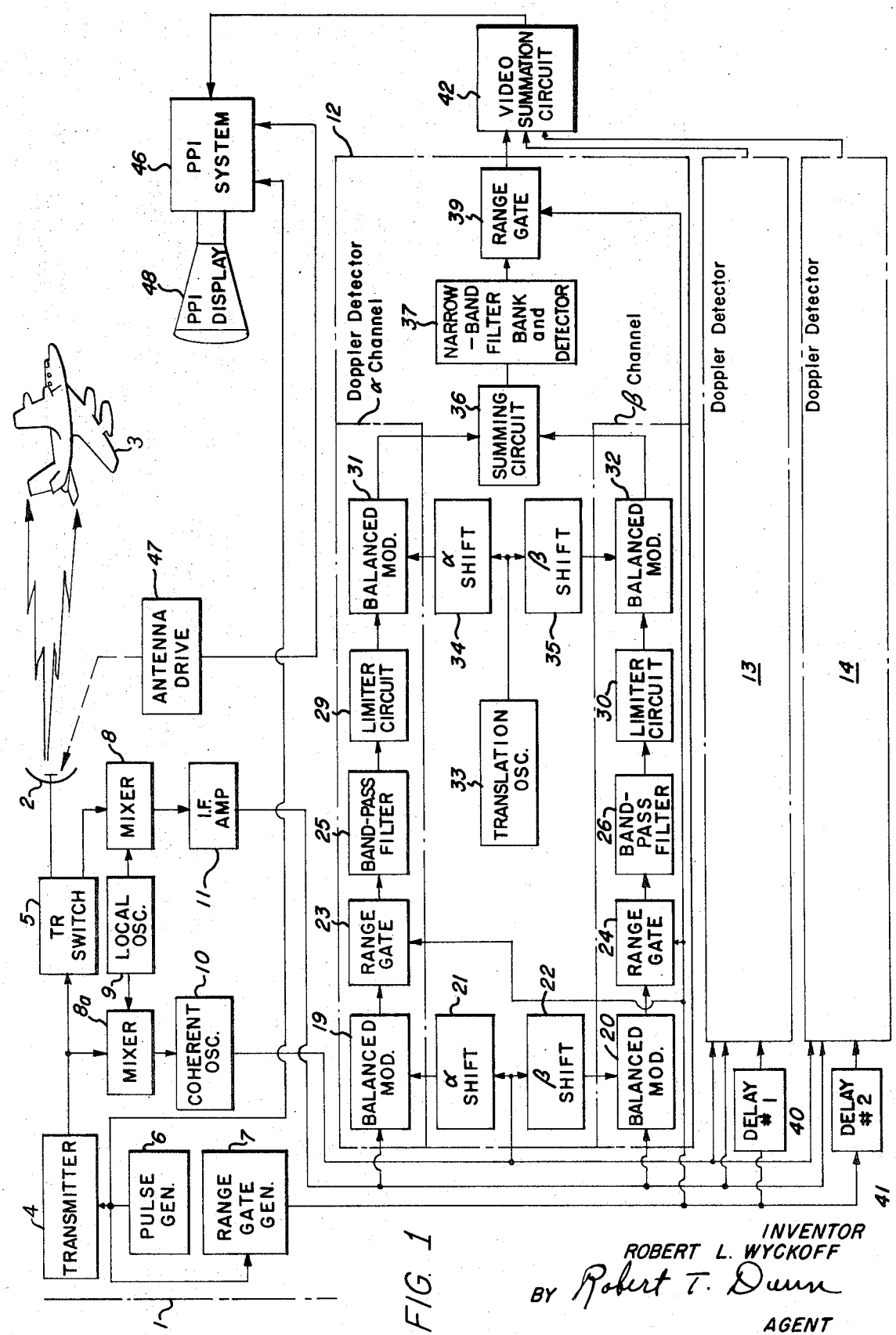
FIG. 1 represents an MTI system and display including a plurality of clutter frequency filter systems incorporating features of the present invention each for detecting moving targets at a given range.

Turning first to FIG. 1 there are shown the transmitting and receiving parts of a typical MTI system 1 including an antenna 2 radiating signals which are reflected from a moving target 3. Power is applied to the antenna from transmitter 4 through transmit-receive (TR) switch 5. The transmitter is controlled by the output of pulse generator 6 which also triggers range gate generator 7. The output of TR switch 5 consisting of Doppler-shifted signals reflected from moving target 3 and clutter is fed to mixer 8, while at the same time the RF output of transmitter 4 is applied to mixer 8a. Mixers 8 and 8a are fed by local oscillator 9, mixer 8 producing IF signal and mixer 8a triggering a coherent oscillator 10. The output of mixer 8 is amplified in IF amplifier 11 and along with the output of coherent oscillator 10 and range gate generator 7 applied to clutter frequency filter systems 12, 13 and 14. Systems 12, 13 and 14 are identical, and so only the details of system 12 will be described below.

The frequency spectrum of the output of IF amplifier 11 is substantially as shown in FIG. 2b consisting of narrow bands of clutter 15 of relatively large amplitude separated from each other by the pulse frequency rate (the rate of pulse generator 6). Of these narrow bands, the largest amplitude occurs at $f_0$ which is the center of the IF band. Narrow bands 16 of smaller amplitude represent Doppler-shifted signals returned from, for example, moving target 3 which is moving toward antenna 2. Bands 16 are each shifted in frequency relative to the adjacent band 15 by the same amount.

Heretofore, upon mixing the spectrum shown in FIG. 2b with a coherent oscillator frequency precisely equal to $f_0$, a folded spectrum such as shown in FIG. 2a results. Obviously, the sense of the positive Doppler side bands 16 shown in FIG. 2b is lost when the spectrum is folded because the folded spectrum shown in FIG. 2a would look the same whether the Doppler side bands 16 shown in FIG. 2b were positive or negative. The present invention discloses a method whereby the IF spectrum may be folded, and yet the sence of the Doppler side bands remains identified and can be later determined by novel treatment of the signal.

As shown in FIG. 1, the output of IF amplifier 11 is split into two channels α an β in system 12 and fed to mixers 19 and 20. The output of coherent oscillator 10 is also fed to mixers 19 and 20 and is shifted in phase by α and β phase shifters 21 and 22 so that the coherent oscillator frequency fed to mixer 19 is in quadrature and lags that fed to mixer 20. As a result, the lower band spectrum output of mixers 19 and 20 is folded as shown in FIG. 2a. Assuming that Doppler video $E_i$ is represented by the following equation:

(1) $\quad E_i = E_n \cos(\omega_n + \omega_d)t$ where $\omega_n$ represents the center frequency signal of the IF spectrum and $\omega_d$ represents the Doppler-shifted frequency signal then the output of balanced modulator 19 in channel α denoted $E_{a1}$, is expressed as follows:

(2) $\quad E_{a1} = E_n \cos(\omega_n + \omega_d - \omega_0)t + E_n \cos(\omega_n + \omega_d + \omega_0)t$ and the output of balanced modulator 20 in channel β, denoted $E_{b1}$, is expressed as follows:

(3) $\quad E_{b1} = -E_n \sin(\omega_n + \omega_d - \omega_0)t + E_n \sin(\omega_n + \omega_d + \omega_0)t$ where $\omega_0$ represents the frequency output of coherent oscillator 10. The outputs of balanced modulators 19 and 20 are gated by range gates 23 and 24, respectively, which are each controlled by range gate pulses from range gate generator 7. This gating, of course, does not alter signals in the outputs of the modulators expressed by Equations 2 and 3 above, but merely removes clutter and other Doppler video signals from all radar ranges except the range represented by the range pulses from generator 7. The gated signals in the channels expressed by Equations 2 and 3 are next applied to band-pass filters 25 26, respectively, which pass only a narrow frequency band amidst the difference frequencies resulting from the mixing in the balanced modulators, and attenuate the second expression in the right hand member of each of the Equations 2 and 3. The frequency spectrum of signals at the inputs to low pass filters 25 and 26 is substantially as represented in FIG. 2a. This spectrum is obviously similar to the frequency spectrum of signals appearing in the output of IF amplifier 11 and represented in FIG. 2b, but is folded as a result of mixing in the balanced modulators. The Doppler shift bands 16 in FIG. 2b are folded about the IF frequency $f_0$ and appear as bands 16a in FIG. 2a, while clutter represented by bands 15 in FIG. 2b appear as relatively large amplitude bands 15a in FIG. 2a. Filters 25 and 26 preferably pass only a narrow band including one of the Doppler side bands shown in FIG. 2a. The lowest frequency Doppler side band 27, for example, included in the band enclosed by broken line 28 is most suitable and, therefore, it is preferred that the band-pass characteristics of filters 25 and 26 be substantially as represented by broken line 28. As a result, the output of low pass filters 25 and 26 are denoted as $E_{a2}$ and $E_{b2}$ and can be represented as follows:

(4) $\quad E_{a2} = E_n \cos(\omega_n + \omega_d - \omega_0)t$ (5) $\quad E_{b2} = -E_n \sin(\omega_n + \omega_d - \omega_0)t$ The outputs of the filters 25 and 26 are next hard limited by limiter circuits 29 and 30 respectively. Hard limiting causes very little change in the shape of the spectrum of the outputs of the filters, but it causes the instantaneous sum of all power to be constant. The outputs of limiter circuits 29 and 30 are fed to balanced modulators 31 and 32 wherein these outputs are mixed with the frequency $f_c$ from translation oscillator 33, a signal denoted herein as $\omega_c$. The translation oscillator signal $\omega_c$ is applied to the balanced modulators 31 and 32 in phase quadrature, and for this purpose α phase shifter and β phase shifters 34 and 35 are provided coupling the output of oscillator 33 to modulators 31 and 32 respectively. The α phase shifters 34 and 21 correspond to each other just as do the β phase shifters 35 and 22 so that, for example, the coherent oscillator signal $\omega_0$ applied to channel α leads the $\omega_0$ applied to channel β and, correspondingly, translation oscillator signal $\omega_c$ applied to channel α leads the $\omega_c$ applied to channel β. As a result, the output of modulator 31 denoted $E_{a3}$ and the output of modulator 32 denoted $E_{b3}$ are expressed as set forth below:

(6) $\quad E_{a3} = E_n/2 \cos(\omega_c + \omega_n + \omega_d - \omega_0)t + E_n/2 \cos(\omega_c - \omega_n - \omega_d + \omega_0)t$ (7) $\quad E_{b3} = E_n/2 \cos(\omega_c + \omega_n + \omega_d - \omega_0)t - E_n/2 \cos(\omega_c - \omega_n - \omega_d + \omega_0)t$ Upon summing the outputs of modulators 31 and 32 in summing circuit 36, an output $E_o$ is obtained which is expressed as follows:

(8) $\quad E_o = E_n \cos(\omega_c + \omega_n + \omega_d - \omega_0)t$

The input frequency spectrum from each channel to summing circuit 36 is substantially free of clutter and includes side bands which result from the mixing of Doppler side band 27 (shown in FIG. 2a) with $f_c$ and, of course, images thereof separated by the pulse frequency rate. These inputs are substantially as represented by the spectrum in FIG.

2c. An important feature with regard to the output $E_o$ of summing circuit 36 is that certain of the modulation products of modulators 31 and 32 are cancelled, and others are reinforced by the summation with the result that the frequency spectrum is unfolded about $f_c$ unambiguously disclosing positive Doppler signals above $f_c$ and negative Doppler signals below $f_c$. A bank of contiguously-tuned narrow band filters and detectors 37 is used to perform a frequency spectrum analysis. Since clutter signals, having no Doppler shift, were removed by the band-pass filters 25 and 26, only a Doppler-shifted signal will cause an increase in one of the detector outputs of the filter bank 37. This filter bank and multiple detector output is next gated by range gate 39 to produce sharp pulses when Doppler video is present.

Doppler detector circuits 13 and 14 operate in an identical manner to circuit 12 except that gating signals from range gate generator 7 are delayed by successively increasing increments by delays 40 and 41. The delay intervals are preferably multiples of the width of range gate pulses from generator 7. Upon combining the outputs of circuits 12, 13 and 14 in video summation circuit 42, composite video MTI signals suitable for energizing a PPI display are formed. Such a formation of signal including one video pulse is shown in the wave form of FIG. 2d. The pulse 43 in this wave form might, for example, come from circuit 12, while adjacent intervals 44 and 45 indicate that no Doppler video is detected at the ranges controlling Doppler detector circuits 13 and 14. Obviously, a large number of Doppler detector circuits such as circuits 12, 13 and 14 could be connected in parallel each controlled by range gate pulses delayed increasing intervals to form a composite video such as shown in FIG. 2d.

The video from summation circuit 42 is applied to PPI system 46 which is also responsive to the output of antenna drive 47 and the output of pulse generator 6. The display 48 coupled to system 46 is preferably a cathode ray tube display and may present a $\rho$, $\theta$ or Cartesian coordinate raster.

FIG. 3 illustrates another form of Doppler detector system which may be substituted for 12, 13 or 14 in FIG. 1. This includes balanced modulators 19 and 20, $\alpha$ and $\beta$ phase shift circuits 21 and 22, range gates 23 and 24 and band-pass filters 25 and 26 in $\alpha$ and $\beta$ channels just as already described with reference to FIG. 1. The system in FIG. 3 is different in that no translation oscillator is required but instead the outputs of filters 25 and 26 are applied to $\alpha$ and $\beta$ phase shifters 49 and 50 respectively. As already mentioned, the output of filters 25 and 26 denoted $E_{a2}$ and $E_{b2}$ are expressed in Equations 4 and 5. A more rigid analysis reveals the output of filters 25 and 26 as follows:

When $\omega_d$ is upper side band indicating the target is closing with the antenna the input to filter 25 is represented as:

(9) $\quad E'_{a2}=E_n \cos \omega_0 t \cdot \cos (\omega_n + \omega_d)t$ and the input to filter 26 is represented as:

(10) $\quad E'_{b2}=E_n \sin \omega_0 t \cdot \cos (\omega_n + \omega_d)t$ and when $\omega_d$ is lower side band indicating the target is departing from the antenna the input to filter 25 is represented as:

(11) $\quad E'_{a2}=E_n \cos \omega_0 t \cdot \cos (\omega_n - \omega_d)t$ and the input to filter 26 is represented as:

(12) $\quad E'_{b2}=E_n \sin \omega_0 t \cdot \cos (\omega_n - \omega_d)t$

As already mentioned filters 25 and 26 pass narrow bands such as represented by broken line 28 in FIG. 2a. Consequently, the outputs of filters 25 and 26 can be obtained by expanding each of Equations 9 to 12 and striking out terms which represent frequencies outside of the band represented by line 28. This yields general expressions representing the outputs of filters 25 and 26 in channels $\alpha$ and $\beta$ for targets closing or departing in terms of the absolute magnitude of $\omega_d$; and so Equations 9 to 12 take the form of Equations 13 to 16 below.

Closing  Departing
(13) $E'_{a2}=E_n/2 \cos (-\omega_d)t$  (15) $E'_{a2}=E_n/2 \cos (+\omega_d)t$
(14) $E'_{b2}=E_n/2 \sin (-\omega_d)t$  (16) $E'_{b2}=E_n/2 \sin (+\omega_d)t$ The effect of phase shifters 49 and 50 is to delay the signal in $\beta$ channel $\pi/2$ radians relative to the signal in channel $\alpha$. This alters expressions (14) and (16) so that closing and departing conditions yield signals in the $\beta$ channel expressed as follows:

Closing  Departing
(17) $E'_{b2}=E_n/2 \cos (+\omega_d)t$  (18) $E'_{b2}=-E_n/2 \cos (+\omega_d)t$ Next, the signals at each channel are hard limited by limiter circuits 51 and 52 which cause the instantaneous sum of all power in each channel to be constant. The signals in the channels are then summed in summing circuit 53 and subtracted in subtract circuit 54 combining the Doppler side band signals of Equations 13 and 17 or Equations 15 and 18 to produce a null or reinforcement depending on whether the target is closing or departing. For example, assuming that the target 3 is closing with antenna 2, then the summation of Equations 13 and 17 yields:

(19) $\quad$ Sum closing $= E_n \cos (\omega_d)t$ and the difference yields

(20) $\quad$ Difference closing $= 0$

On the other hand, assuming target 3 is departing from antenna 2, the summation of Equations 15 and 18 yields:

(21) Sum departing $= 0$ and

(22) Difference departing $= E_n \cos (\omega_d) t$

Similar diodes 55 and 56 and smoothing circuits 57 and 58 couple the outputs of circuits 53 and 54 to indicators 59 and 60. Indicator 59 indicates the presence of a positive Doppler shift such as occurs when a target 3 is moving toward antenna 2, and indicator 60 indicates the presence of a negative Doppler shift such as occurs when the target is moving away from the antenna.

The $\alpha$ and $\beta$ phase shifters 49 and 50 are preferably wide band phase shift networks such as described in pages 112–115 of the December 1946 edition of "Electronics" published by McGraw Hill Publishing Company of New York City. Such networks shift the phase of signals in different channels by amounts which differ by a constant over a wide range of frequencies; although the amount of shift in each channel may vary somewhat with frequency.

FIG. 4 indicates another embodiment wherein the outputs of summing circuit 53 and subtract circuit 54 are rectified by oppositely polled rectifiers indicated by diodes 61 and 62 and then added together in a common smoothing network 63. A single indicator 64 is coupled to network 63 indicating signal level above or below a reference signal level to thereby indicate the presence of positive or negative Doppler shift video.

While there is described herein various embodiments of the present invention each having advantages over prior systems for detecting Doppler video in an MTI system it is to be understood that these are made only by way of example and do not limit the spirit or scope of the invention. Furthermore, the application of the present invention in the embodiments to an MTI system is made only by way of example and it should be clearly understood that the invention can be employed to detect and distinguish between any side bands particularly in single side band systems where ordinary filter techniques for detecting a given side band are unsuitable.

The spirit and scope of the invention are set forth in the following claims.

What is claimed is:

1. An electrical circuit for detecting the sense of the frequency difference between a plurality of input signals comprising a plurality of means mixing said input signals with a third frequency signal, means for phase shifting said third frequency signal before applying to at least one of said mixing means, means coupled to the output of said mixing means for phase shifting signals therefrom and means coupled thereto for combining said phase shifted signals from different mixing means producing a signal representative of the sense of said frequency difference.

2. An electrical circuit for detecting the sense of the frequency difference between different input signals comprising a plurality of means each mixing said input signals with a third frequency signal including means for phase shifting said third frequency signal different amounts before mixing in different mixing means, means coupled to the outputs of said mixing means for phase shifting said outputs different amounts and means for combining differently phase shifted outputs producing a signal representative of the sense of said frequency difference.

3. An electrical circuit for detecting the sense of the frequency difference between two input signals comprising a plurality of means each mixing both of said input signals with a third frequency signal including means for phase shifting said third frequency signal before applying to at least one of said mixing means, means coupled to the outputs of said mixing means for phase shifting outputs therefrom different amounts and means coupled thereto for combining said differently shifted outputs producing a signal representative of the sense of said frequency difference.

4. An electrical circuit for detecting the presence of a given frequency signal in a composite signal and the sense of the difference between said given frequency signal and a reference frequency comprising means splitting said composite signal into a plurality of different channels, means mixing said composite signal in each channel with said reference frequency, said reference frequency in each channel being shifted in phase by different amounts, means for phase shifting the output of said mixing means by different amounts in each channel producing an output from each channel and means combining said outputs to produce signals representative of the presence of said given signal and the sense of said frequency difference.

5. A device as in claim 4 in which said combining means includes means for summing the outputs of said channels and means for subtracting the outputs of said channels, said summing means producing a signal representative of one sense of said frequency difference and said subtract means producing a signal representative of the other sense of said frequency difference.

6. A device as in claim 4 in which said combining means includes means for summing the outputs of said channels and means for subtracting the outputs of said channels and means for combining the outputs of said summing and subtracting means producing a signal level indicative of the presence of said given frequency and the sense of said frequency difference.

7. An electrical circuit for detecting the presence of a given frequency signal in a composite signal and the sense of the difference between said given frequency signal and reference frequency comprising means splitting said composite signal into at least two different channels, means mixing said composite signal in each channel with said reference frequency, said reference frequency in adjacent channels being in quadrature, means for phase shifting the output of said mixing means by different amounts in each channel producing an output from each channel and means combining said outputs to produce signals representative of the presence of said given signal and the sense of said frequency difference.

8. An electrical circuit for detecting the presence of a given frequency signal in a composite signal and the sense of the difference between said given frequency signal and a reference frequency comprising means splitting said composite signal into two different channels, means mixing said composite signal in each channel with said reference frequency, said reference frequency in said channels being in quadrature, means for phase shifting the output of said mixing means by different amounts in each channel producing an output from each channel and means combining said outputs to produce signals representative of the presence of said given signal and the sense of said frequency difference.

9. An electrical circuit for detecting the presence of a given frequency signal in a composite signal and the sense of the difference between said given frequency signal and a reference frequency comprising means splitting said composite signal into first and second channels, means mixing said composite signal in each channel with said reference frequency, said reference frequency in said first channel leading said reference frequency in said second channel amounts, means in said channels for advancing the phase of the output of said mixing means in said first channel relative to said second channel producing an output from each channel and means combining said outputs to produce signals representative of the presence of said given signal and the sense of said frequency difference.

10. An electrical circuit for detecting the presence of a given frequency signal in a composite signal and the sense of the difference between said given frequency signal and a reference frequency comprising means splitting said composite signal into first and second channels, means mixing said composite signal in each channel with said reference frequency, said reference frequency in said first channel leading said reference frequency in said second channel in phase by $\pi/2$ radians, means in each channel for attenuating one side band which results from said mixing, means in each channel for advancing phase of the other side band which results from said mixing by $\pi/2$ radians more in said first channel than said second channel producing an output from each channel and means combining said outputs to produce signals representative of the presence of said given signal and the sense of said frequency difference.

11. An electrical circuit for detecting the presence of Doppler video in the spectrum of intermediate frequency comprising means applying said spectrum to at least two different channels, first means in each channel for mixing said spectrum with a reference frequency substantially equal to said intermediate frequency said reference frequency being applied in quadrature to said two channels, means in each channel for attenuating the upper side band and the carrier frequency which results from said mixing, second means in each channel for mixing the other side band which results from said first mixing with a translation frequency signal, said translation frequency signal being applied in quadrature to said two channels, said second means for mixing producing an output from each channel, means combining the outputs from said channels, filter means coupled to said combining means for passing frequency bands above and below said translation frequency producing a signal representative of the presence of said Doppler video.

12. An electrical circuit for detecting the presence and sense of Doppler video in intermediate frequency spectrum comprising two channels each energized by said intermediate frequency spectrum, mixing means in each channel for mixing said intermediate frequency spectrum with a reference frequency substantially equal to intermediate frequency, said reference frequency being applied in quadrature to said two channels, filter means in each channel for attenuating one side band which results from said mixing, means in each channel whereby the other side band resulting from said mixing is phase shifted different amounts in each channel producing outputs from each channel, means summing the outputs from each channel, means subtracting the outputs from each channel and means coupled to said summing and subtracting means producing indications of the presence and sense of said Doppler video.

13. In a moving target indicating system including transmitter means energizing means for radiating signals in the direction of targets, means responsive to said signals reflected from said targets for energizing receiver means producing IF signals having a frequency spectrum including Doppler shifted reflected signals, means for detecting the presence and sense of said Doppler shifted signals and energizing displays comprising a plurality of Doppler signal detectors each including at least two channels, means applying said IF signals to each of said channels, means in each channel for shifting the center of said IF spectrum, said spectrum shifting means in each channel including a balanced modulator and means applying a reference frequency signal to each channel in quadrature as between channels in each of said detectors, means in each channel for attenuating the upper side band and carrier frequency which results from said mixing, means in each channel for phase shifting the other side band which results from said mixing by amounts which differ by $\pi/2$ radians as between channels in each of said detectors producing an output from each channel, means in each detector for combining and filtering the outputs of each channel included therein producing a signal indicative of said Doppler shifted signals, means gating the output of each of said detectors each gating means being controlled by gate pulses delayed different amounts, means summing the outputs of said gating means producing a composite video signal, means applying said composite video signal to a cathode ray tube display and means coupled to each of said detecting means for indicating the sense of motion of said target.

References Cited

UNITED STATES PATENTS

| | | | |
|---|---|---|---|
| 2,909,656 | 10/1959 | Meyer | 343—8 |
| 3,003,147 | 10/1961 | Lueg | 343—8 |

RODNEY D. BENNETT, JR., Primary Examiner

M. F. HUBLER, Assistant Examiner

U.S. Cl. X.R.

324—78; 328—133, 134